Aug. 12, 1958 P. I. ACKERMAN 2,847,237
COUPLING FOR PIPING SECTIONS
Filed Dec. 14, 1953
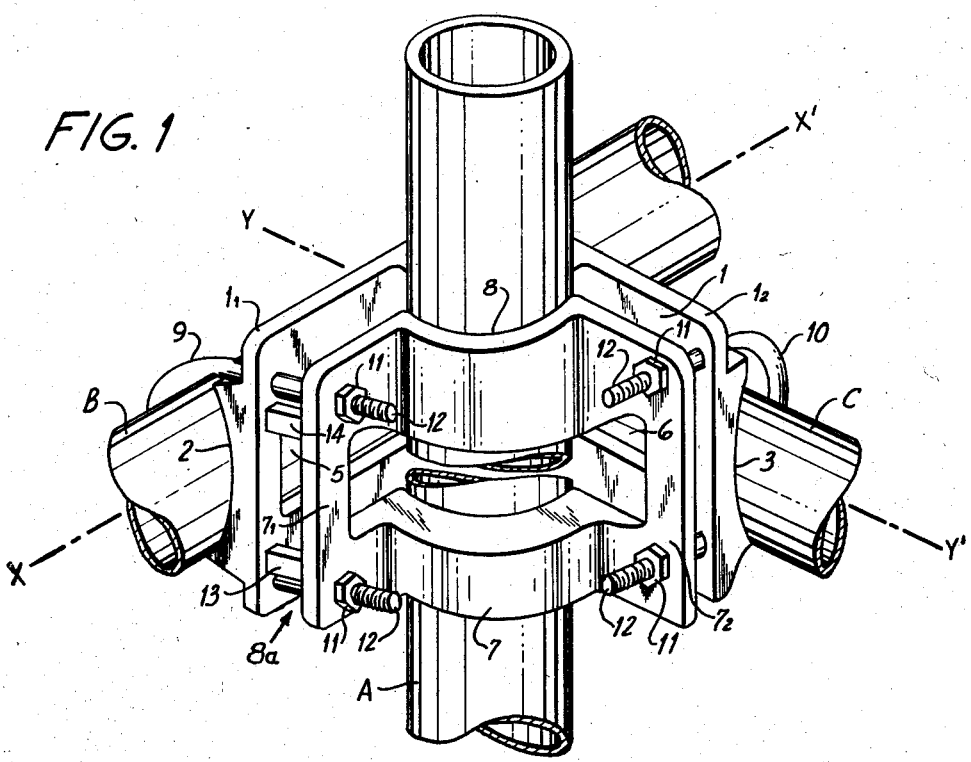
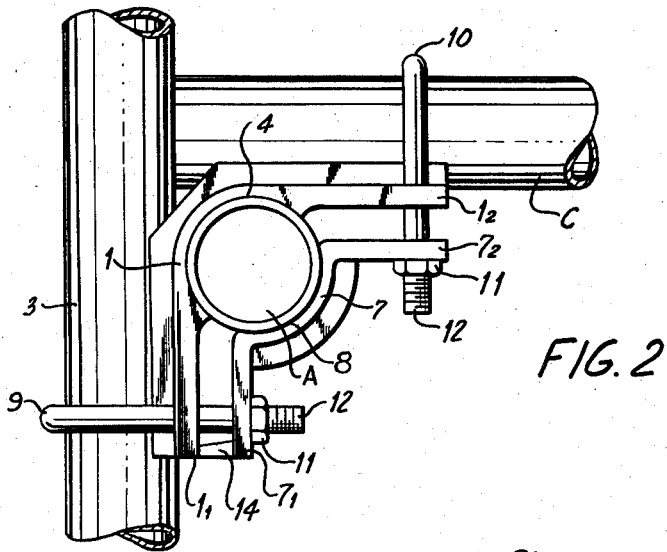
INVENTOR.
PAUL ISIDOR ACKERMAN United States Patent Office 2,847,237
Patented Aug. 12, 1958

2,847,237
COUPLING FOR PIPING SECTIONS
Paul Isidor Ackerman, Marrakech, Morocco
Application December 14, 1953, Serial No. 398,135
Claims priority, application France July 2, 1953
2 Claims. (Cl. 287—54)

The present invention relates to a bonding device for piping constructions in which a retaining angular part is provided on its adjacent external surfaces with bearings in which the tubes to be held together are secured. This device more particularly is suited to enable at least two tubes to be coupled together, in such a manner that the latter are located in transverse directions and in the same plane.

It is an object of the present invention to provide means facilitating the retention of a third pipe in perpendicular direction to a pair of pipes extending in transverse directions in the same plane.

Another object of the invention is to provide a retaining part which has a supporting bearing inside the angle formed by its two adjacent flanges, which enables a third tube, which passes inside the angle formed by the two flanges, to be held in predetermined position relative to two transverse pipes disposed on the outside of said flanges, respectively.

This retaining part is combined with another retaining part or cover whose supporting bearing is applied so that it fixes on the tube situated in the angle of the angular retaining part.

Another purpose of the invention is to operate so that the transverse tubes, resting in supporting bearings of the external surfaces of the angular retaining part, are fixed by means of clamps which envelop them on the external side and then traverse the flanges of the retaining part, so as to accommodate tightening nuts, this method of fixing having the advantage of being simple and rapid.

Another purpose of the invention relates to a bonding device for tubular constructions which comprise: a retaining part co-operating with a retaining part or cover, for holding a first tube; the retaining part having bearings on its adjacent external surfaces in which other tubes are held by means of clamps or other tightening means, stops being inserted between the retaining part and the supporting part, these stops having the effect of balancing the tightening of the tube.

Other purposes and objects of the present invention may be realized from the description and drawings hereinafter given and shown, in which:

Figure 1 is a perspective view of a construction part whose tubular sections are secured by a coupling according to the invention.

Figure 2 is a plan view of this coupling.

The coupling shown in these drawings comprises a retaining part 1 whose section has two adjacent flanges $1_1$ and $1_2$ which form an angle of 90° between them.

On these two external surfaces, this retaining part 1 is provided with cylindrical supporting bearings 2 and 3 in the shape of grooves.

In the example shown, these grooves are made along horizontal axes and located in the same horizontal plane.

The groove 2 receives a tube B which it centers and holds along a horizontal axis X, X', whereas the groove 3 receives a tube C which it holds in the same plane along horizontal axis Y—Y'.

The tube C stops perpendicularly to the external surface of the flange $1_1$ of the retaining part 1 and thus checks against the tube B which, in the case shown, extends beyond the external surface of the flange $1_2$.

The retaining part also has, inside the right angle formed by the flanges $1_1$ and $1_2$, a supporting bearing 4 in the shape of a semi-cylindrical groove which centers a tube A perpendicular to the other two (vertical in the case of Figures 1 and 2).

The retaining part 1 is also provided with cavities 5 and 6 on its adjacent flanges $1_1$ and $1_2$ in order to reduce the weight thereof.

A second retaining part 7 or cover whose semi-cylindrical shaped supporting bearing 8 clamps on the tube A for a distance and complementary with the bearing 4 of the retaining part 1, has two lateral flanges $7_1$ and $7_2$ which come opposite the flanges $1_1$ and $1_2$ of the retaining part 1.

This cover 7 also has a central cavity or cut out 8a so as to reduce its weight.

Clamps 9 and 10, consisting of U-shaped rods whose ends are engaged in the holes of the flanges $1_1$ and $1_2$, are situated on either side of the bearings 11 and 12 in the corresponding holes of the flanges $7_1$ and $7_2$ of the cover 7.

These clamps 9 and 10 encircle the tubes B and C on their external side and ensure their fastening by holding them in the grooves 2 and 3 with the nuts 11 fixed to the threaded ends 12 of these clamps.

The clamps 9 and 10 also ensure the tightening of the tube A between the supporting part 1 and the supporting part 7.

According to one of the particular features of the invention, the retaining part or cover 7 is provided on one of its adjacent flanges with stops or spacers 13 and 14 extending toward the complementary flange of the retaining part 1.

These stops have the purpose of balancing the tightening of the vertical tube A. These stops 13 and 14 arrive from the factory with the retaining part or cover 7. In the absence of the stops 13 and 14, the mounting of the device proves to be very complicated, thus involving a considerable loss of time.

The coupling device described above affords numerous advantages and more particularly the following:

(1) It enables two tubes whose directions are transverse, to be fixed in the same plane in an efficacious manner and without diminishing their strength.

(2) In a vertical direction, the bond is effected in an equally efficacious manner, thus preventing slipping owing to the extensive holding surfaces of the bearings 4 and 8.

(3) The stops 13 and 14 fitted on one of the flanges $7_1$ of the cover 7 enable the tightening to be balanced. Owing to this, the vertical tube A is rigidly secured between the parts 1 and 7.

(4) The device is extremely easy to make, and consequently quite cheap.

(5) Fixing by means of clamps 9 and 10 affords the advantage of preserving the exterior from any dangerous and hindering projection.

It is clearly understood that the invention is not restricted to the forms of embodiment precisely described and shown. If required, recourse may be had to other forms of embodiment without going outside the scope of the invention for that purpose.

Having thus described the invention, what is claimed as new and desired to be secured by Letters Patent, is:

1. In a coupling device for pipe sections, a first retaining part having a pair of adjacent flanges defining a right angle therebetween and provided with first and second bearing surfaces on the outside of said flanges, respectively, the inside of said flanges defining a third bearing surface extending in substantially perpendicular direction to said first and second surfaces and located at a predetermined distance from a given axis on one side thereof, a second retaining part having a pair of flanges directed toward and spaced from said flanges of said first retaining part, respectively, and provided with a fourth bearing surface complementary with said third bearing surface and spaced substantially at said distance from said axis on the opposite side thereof, a pair of clamping means for holding pipe sections, respectively, on said first and second bearing surfaces and for holding said first and second retaining parts together, and spacer means remote from said third bearing surface extending from only one of said flanges of one retaining part adjacent one of said clamping means toward the opposite flange of the other of said retaining parts for maintaining the latter two flanges spaced from each other, whereby upon inserting a pipe section between said first and second retaining parts on said third and fourth bearing surfaces for retention in predetermined position relative to pipe sections held on said first and second bearing surfaces, displacement of said retaining parts toward each other upon operation of said one clamping means is limited adjacent the latter clamping means by said spacer means.

2. In a coupling device for pipe sections having a first retaining part with a pair of adjacent flanges extending perpendicular to each other and having first and second concave bearing surfaces on the outside of said flanges, respectively, the inside of said flanges defining a third concave bearing surface extending in substantially perpendicular direction to said first and second surfaces and forming part of a cylinder, a second retaining part having a pair of flanges spaced from and directed toward said flanges of said first retaining part, respectively, and provided with a fourth concave bearing surface complementary with said third bearing surface and forming another part of said cylinder, a pair of U-shaped clamping members for holding pipe sections, respectively, on said first and second bearing surfaces and for retaining in position said first and second retaining parts, and a pair of spacers remote from said third bearing surface fixed to and extending from only one of said flanges of one of said retaining parts adjacent one of said clamping members toward the opposite flange of the other of said retaining parts, said spacers, when they engage said opposite flange, locating said third and fourth bearing surfaces substantially at different portions of said cylinder, respectively, whereby after said one clamping member is connected to said retaining parts, the latter are properly positioned to receive the other clamping means.

References Cited in the file of this patent

UNITED STATES PATENTS

| | | |
|---|---|---|
| 895,397 | Brazelle | Aug. 4, 1908 |
| 1,025,243 | Carpenter et al. | May 7, 1912 |
| 2,322,583 | Marshall | June 22, 1943 |

FOREIGN PATENTS

| | | |
|---|---|---|
| 983,249 | France | Feb. 7, 1951 |